United States Patent [19]

Nava et al.

[11] 4,394,394

[45] Jul. 19, 1983

[54] PROCESS FOR PRODUCING DRY DISCRETE AGGLOMERATED GARLIC AND ONION AND RESULTING PRODUCTS

[75] Inventors: Louis J. Nava, Redwood City; Neal L. Ewing, Livermore, both of Calif.

[73] Assignee: Foremost-McKesson, Inc., San Francisco, Calif.

[21] Appl. No.: 180,615

[22] Filed: Aug. 25, 1980

[51] Int. Cl.³ .................. A23B 7/02; A23L 1/224; A23L 1/223

[52] U.S. Cl. .................. 426/285; 426/453; 426/456; 426/640; 99/474

[58] Field of Search .............. 426/638, 640, 285, 453, 426/455, 456, 471; 23/313 R

[56] References Cited

U.S. PATENT DOCUMENTS

| | | | |
|---|---|---|---|
| 2,851,364 | 9/1958 | Peebles | 426/285 |
| 2,957,771 | 10/1960 | Prater et al. | 426/453 |
| 3,313,629 | 4/1967 | Thompson et al. | 426/453 |
| 3,331,306 | 7/1967 | Hutton et al. | 426/453 |
| 3,378,380 | 4/1968 | Yamamoto et al. | 426/453 |

OTHER PUBLICATIONS

Van Arsdel, W. B. & Copley, M. J. *Food Dehydration*, vol. 1–Principles, AVI Publishing Co., Inc. ©1963, pp. 146–154.

*Primary Examiner*—Raymond N. Jones
*Assistant Examiner*—Elizabeth J. Curtin
*Attorney, Agent, or Firm*—Flehr, Hohbach, Test, Albritton & Herbert

[57] ABSTRACT

A method for producing agglomerated products from garlic powder, onion powder, or mixtures thereof. The method includes the use of upright apparatus suitable for co-mingling free-falling, dry powder materials with atomized water, drying the agglomerated particles with hot air and operating at an air pressure slightly below atmospheric.

5 Claims, 2 Drawing Figures

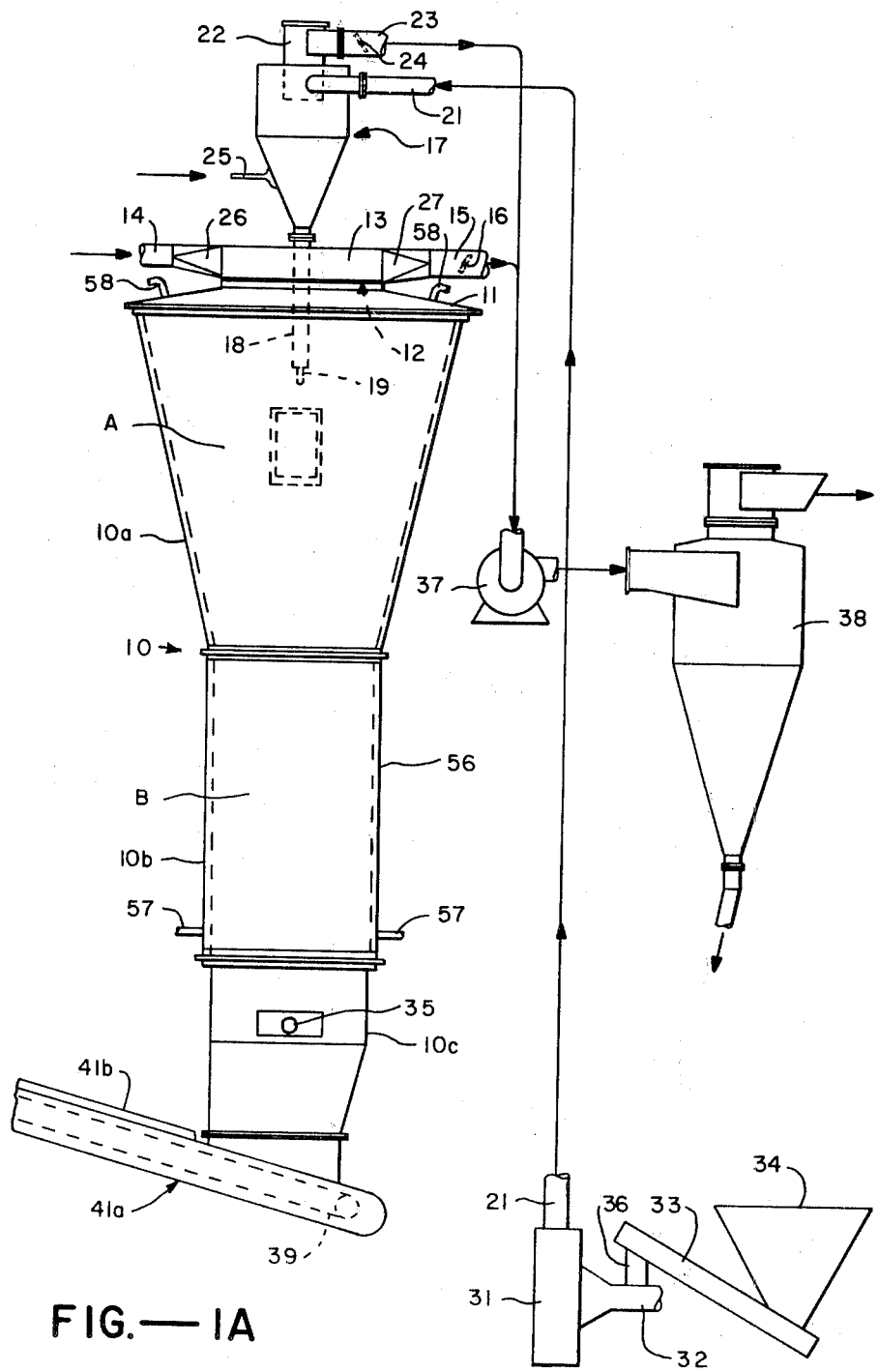
FIG.—1A

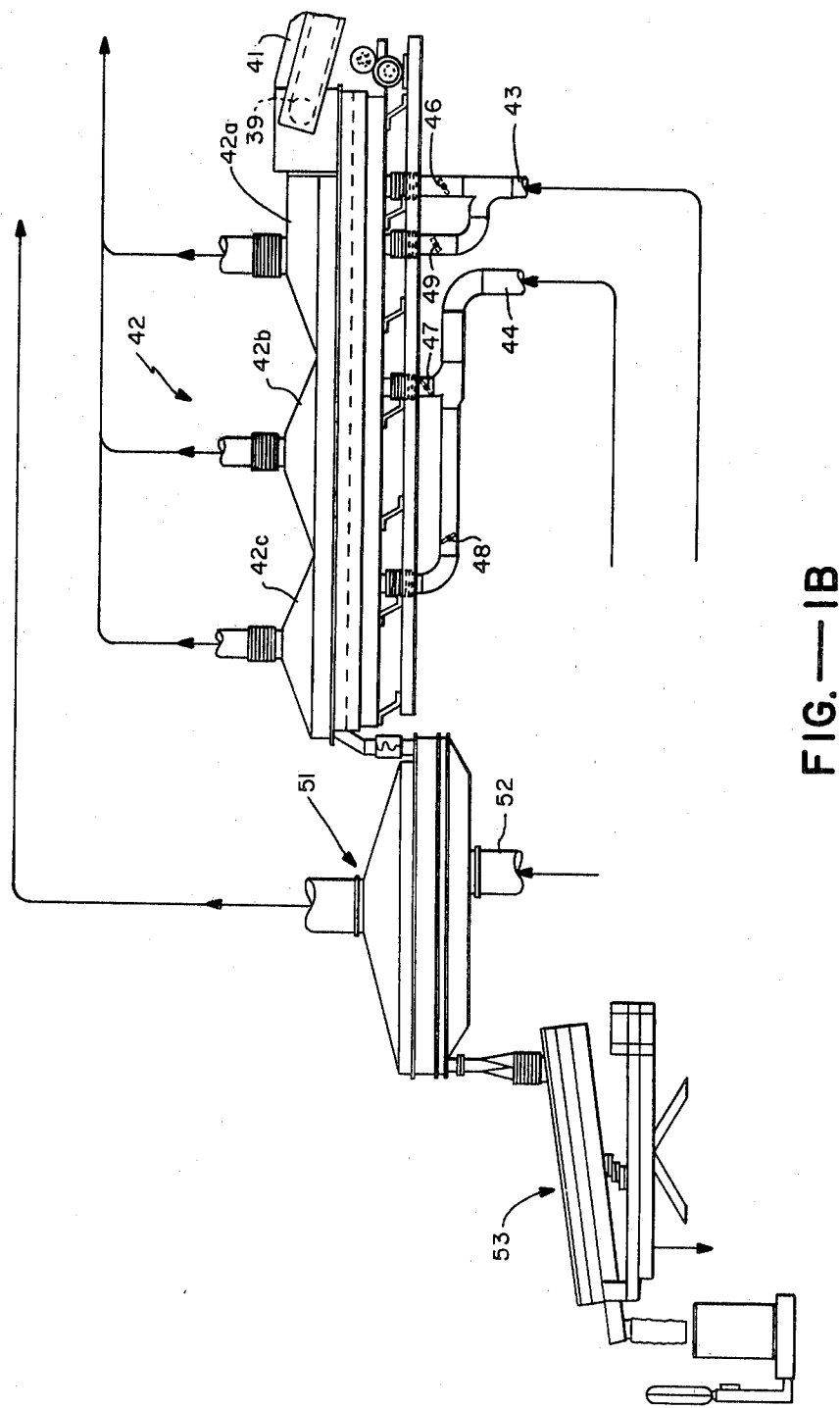
FIG.—1B

PROCESS FOR PRODUCING DRY DISCRETE AGGLOMERATED GARLIC AND ONION AND RESULTING PRODUCTS

This invention relates generally to the manufacture of discrete dry agglomerated products from garlic or onion. More specifically, it relates to apparatus and processes for producing such materials and to the resulting commercial products.

As is well known, garlic and onion are species of the genus Allium. Dry products derived from the solids of garlic and onion are widely used commercially as seasoning materials. Garlic powder is commonly manufactured by sliding or dicing garlic cloves, after which the material is dried by contact with drying air to a moisture content of the order of 4 to 6%. It is then ground and sized to a particle size and size distribution as desired. Similar methods are used for producing dry onion powder. Such dried products may also be produced by grinding and slicing dried fragments separated from dried pieces of garlic or onion during their processing. Such powders may be marketed for use as seasoning materials, or they may be blended with larger particle sized dried garlic or onion, to produce products of a desired bulk density and size distribution. The bulk density of the raw powder products may in typical instances be of the order of 0.690 to 0.833 grams per cubic centimeters.

For a number of reasons, it is desirable to convert such dried powdered products to the form of discrete agglomerates. Prater et al, U.S. Pat. No. 2,957,771, proposed various methods and equipment of carrying out such an agglomerating operation. The equipment and methods disclosed by Prater et al involved serious difficulties in actual operation, which is attributed largely to the fact that when the dry powder is agglomerated with addition of moisture, the resulting agglomerates are relatively sticky and tend to adhere to surfaces of the agglomerating equipment with which the sticky agglomerates come into contact. This makes it difficult, if not impossible, to produce a discrete material to a desired uniform moisture content, it interferes with stable processing control, and it requires frequent shut-down of equipment for cleaning. Also, the methods and equipment such as disclosed in Prater et al tend to produce aggregates that are not sufficiently tough or firm to withstand handling and packaging without undue physical disintegration.

Another method for producing agglomerated onion and garlic powders is disclosed in Yamamoto et al, U.S. Pat. No. 3,378,380. The method in that instance consists in drying onion or ring slices to a moisture content of the order of 12%, after which the material is subdivided by milling. The resulting moist divided material is agglomerated by use of a fluidized bed of the material, the particles being caused to adhere together by elevating the temperature without adding further moisture. Elevating the temperature of the moist powder to cause the particles to adhere together has certain disadvantages for commercial operation. For example, instantizing by maintaining a fluidized bed together with heating of the powder particles may involve critical control to avoid adherence of material to the supporting surfaces of the fluidized bed equipment, to maintain uniformity with respect to the toughness or firmness of the resulting aggregates, to provide the bulk density and particle size distribution desired, and to maintain acceptable color. In addition, a moisture content of the order of 12% is of itself sufficient to cause the particles to be sticky, thus making the product difficult to handle and process in equipment of the fluidized bed type.

The agglomeration or instantizing of dry powder products is disclosed in Peebles, U.S. Pat. No. 2,835,586. In that instance, the process is applied to the manufacture of instantized or agglomerated dry milk from anhydrous spray dried milk powder. The equipment and method disclosed in that patent, and other forms of instantizing equipment and methods used in the dairy industry, are not applicable to the production of dry agglomerated garlic or onion products. This is attributed to the fact that garlic and onion contain vegetable sugar that is readily soluble. When agglomerates of garlic or onion powder have a substantial moisture content, the moistened vegetable sugar causes the particles and agglomerates to be quite sticky, and, therefore, they cannot be handled in the manner disclosed in the Peebles patent. It should be noted that Peebles discloses the agglomeration of milk powder in an agglomerating region at a temperature well above atmospheric, and that the agglomerates delivered from the agglomerating chamber for final drying have a moisture content of the order of 10% or more.

In general, it is the object of the present invention to provide an agglomerating apparatus and process which is well adapted for the production of dry agglomerated garlic or onion and which consistently produces products of the desired bulk density, particle size distribution, and toughness or firmness requirements.

Another object is to provide an apparatus and process which avoids the difficulties of prior processes, having particular reference to the handling of sticky agglomerates. Another object is to provide high quality dry agglomerated products consisting of the solids of garlic or onion, or combinations thereof.

In general, the present method produces a dry, discrete agglomerated product from dry powder derived from the group consisting of garlic and onion and combinations thereof. The method employs an upright chamber and comprises introducing dry garlic or onion powder, together with an air stream in which it is dispersed, into an agglomerating region in the upper part of the chamber. Simultaneously, atomized water is introduced into the agglomerating region thereby causing the powder particles to be co-mingled with water droplets. The wetting of the powder particles by contact with water droplets causes the particles to become sticky, whereby random contacts of the wetted sticky particles forms moist, sticky porous aggregates. Drying air is continuously introduced into a drying region in the lower part of the chamber whereby such air progresses upwardly toward the agglomerating region. The dispersed moist aggregates progress downwardly into the drying region whereby sufficient moisture is rapidly removed to render the aggregates non-sticky before they contact and cling to surfaces of the equipment. The aggregates are then discharged from the lower end of the chamber, and are further dried to the moisture content desired. Following final drying, it is preferable to rapidly reduce the temperature of the aggregates by contact with cooling gas. Preferably, some air is continually introduced into the upper portion of the agglomerating chamber to prevent condensation of moisture on the top chamber wall. The equipment includes an upright treatment chamber, having means at its upper end for introducing the dry powder to be agglomerated, together with an air stream. Also, means are provided for introducing atomized water droplets into the upper part of the chamber, whereby the water droplets and the incoming powder particles are co-mingled to wet the particles, and thereby causing the particles to become sticky and to adhere together in the form of agglomerates. Drying gas is introduced into the lower part of the chamber to produce a drying region into which the dispersed moist agglomerates are received. The moist agglomerates thereby are dried to a lower moisture content such that they are no longer sticky and can be discharged from the apparatus for finish drying. Conveying means receives the agglomerates from the treatment chamber and the arrangement is such that the lower end of the treatment chamber is sealed to facilitate maintenance of a negative pressure within the chamber. The conveyor delivers the agglomerates to secondary drying and cooling means.

Additional objects and features of the invention will appear from the following description in which a preferred embodiment has been set forth in detail in conjunction with the accompanying drawings.

The FIGS. 1A and 1B of the drawing, taken together, illustrate equipment that is especially adapted for carrying out the present process.

The equipment consists of a chamber forming structure 10, having upper and lower parts 10a and 10b. Agglomeration of powder takes place in the part 10a and drying of the agglomerates takes place primarily in part 10b. Part 10a in this instance is conical shaped, and its lower end connects directly with the upper end of part 10b, which may be cylindrical as illustrated. However, this is not essential since, for example, both parts 10a and 10b may be cylindrical. The two parts 10a and 10b, together with the lower extension 10c, form a superposed vertical extending treatment chambers. The upper end of part 10a is enclosed by the top wall 11, which has a central opening 12 directly communicating with the structure 13. Diametrically opposite sides of this structure 13 are connected with inlet and exhaust ducts 14 and 15. Control damper 16 is installed in conduit 15 and serves to control the absolute pressure in chamber 10.

A feed cyclone 17 is disposed above the structure part 10a, and the lower end of its conical portion connects with the downwardly extending pipe 18, which is concentric with the central axis of the part 10a. The structure 13 is annular as viewed in plan and surrounds the pipe 18. A duct 21 communicates tangentially with the upper portion of the feed cyclone 17 and serves to introduce a stream of air in which the dry feed powder is dispersed. The central outlet conduit 22 of the cyclone connects tangentially with the conduit 23, which is shown provided with a flow controlling damper valve 24. A pipe 25 connects with a source of water under pressure and extends downwardly through the center of pipe 18. It is provided with a spray nozzle 19 at its lower end. The connections of the conduits 14 and 15 with the structure 13 is through the transitions 26 and 27. Also, the interior of the structure 13 is provided with a diametrically extending spitter wall, which is disposed vertically and in a plane coincident with the axes of the conduits 14 and 15.

Suitable means for dispersing the feed powder into the air stream supplied to conduit 21, consists of a blower 31 having its discharged side connected to conduit 21, and having its inlet conduit 32 connected to a suitable source of air, such as air that has been filtered. Conveying means 33 of the feed screw type conveys the dry feed powder from the hopper 34, to the upper end of the conduit 36, whereby the powder is supplied to the air stream flowing through conduit 32, at a predetermined rate. The filtered air supply to conduit 32 can be either ambient or air heated by passage through a heat exchange unit.

The air exhausted through conduit 15 together with the air discharged from conduit 23 of the feed cyclone are shown connected to the inlet side of the common exhaust fan or blower 37, the discharged side of which may be connected to the separating cyclone 38. The fines thus recovered may be recycled by returning them to the conduit 32.

Conduits 35 communicates through diametrically opposite sides of the extension 10c. They connect to a fan or blower (not shown), which, in turn, receives drying air at an elevated temperature, for example, a temperature within a range of about 200° to 280° F. Aggregates which progress downwardly through the extension 10c are deposited upon the upper run of the endless belt conveyor 39. The conveyor is of the type enclosed within a housing 41a, and the upper wall of the housing is directly coupled with the lower end of extension 10c. The housing is indicated as having a cover 41b which can be removed for inspecting the material being carried by the conveyor. The conveyor delivers the agglomerates to the drier 42 which preferably is of the vibrating screen type. In this instance, the drier has three sections 42a, 42b and 42c, with the first section being supplied with drying air through the conduit 43 and the sections 42b and 42c being supplied with drying air through the common conduit 44. Damper valves 46, 47, 48, and 49 are provided for adjusting the flow of drying air to each of the sections. The drying air supplied to conduit 43 may be at a temperature within the range of about 180° to 260° F., and air supplied to the conduit 44 at a temperature within the range of about 180° to 260° F.

The agglomerates delivered to the conveyor 39 may, for example, have a moisture content ranging from about 7 to 9%. Further drying serves to reduce the moisture content to a value suitable for commercial purposes, as, for example, less than 6.75%. The aggregates discharging from the drier are at an elevated temperature, as, for example, within the range of about 120° to 180° F. Rapid cooling is carried out by delivering the agglomerates to the cooling section 51 which is likewise of the vibrating screen type with its inlet conduit 52 connected to a source of filtered and dehumidified cooling air. The air, for example, may have a temperature of the order of 50° to 70° F., with an absolute humidity of the order of 20 to 50 grains of water per pound of dry air. For commercial purposes, it is desirable to subject the agglomerates to sizing which can be carried out by the multiple deck sifting screen 53. Finely divided powder and oversized particles, separated out at this point, may be recycled by returning such material for reprocessing by way of conduit 32 and blower 31. The exhaust from collector 38 may connect with further collectors (not shown) and the collected material returned to the process by way of conduit 32.

When the equipment described above is in operation, a constant stream of atmospheric or heated air in which dry feed powder has been introduced at a predetermined rate, is continuously introduced into the feed cyclone 17. Some air discharges from the cyclone through the conduit 23, and some air flows downwardly through the pipe 18, together with the dispersed powder. As the stream of air and dispersed powder is delivered into the space below the conduit 18, it spreads laterally due to some swirling action imparted by the swirling of air within the feed cyclone, and it is co-mingled with atomized droplets of water discharging from the nozzle 19. Air supplied through conduits 14, 35 and 18 is exhausted from chamber 10 through conduit 15. The rate that air is exhausted is controlled by adjustment of the damper 16, and this adjustment also determines the pressure within the chamber and controls the rate of downward progression of the aggregates.

The hot drying air supplied through the conduits 35 flows upwardly into the section 10b. The descending moist aggregates are thereby received in a drying medium whereby the moisture content is removed while the aggregates remain dispersed. In other words, in section 10a there is an upper region or chamber A in which agglomeration takes place, and below this region or chamber there is a drying region or chamber B which extends within the section 10b.

The amount of moisture applied to the feed particles in the agglomerating region A is such that as the moisturized agglomerates leave this region, they have a moisture content of the order of 8 to 14%, and they are relatively sticky and have little strength. However, in the drying region B, the moisture content is reduced to a level of the order of 7 to 9%, whereby they lose their sticky character and become sufficiently firm for handling by the conveyor 39 and the shaker drier. The top 11 and the sidewalls of parts 10a and 10b preferably are cooled by atmospheric air circulated through the jacket 56 by way of the air inlet and discharge pipes 57 and 58. This serves to minimize any adherence of agglomerates to the side walls while the agglomerates are in sticky condition.

It is necessary to control the air flow into and out of the chamber structure in such manner as to insure proper operation. Thus, flow of air through conduit 15 is regulated by damper 16 whereby a slight negative pressure is maintained within the treatment chamber. Also, continuous upward movement of drying air in section 10b is maintained, which, however, is at such a velocity that it does not impede downward movement of aggregates by gravity. Also, introduction of air through conduits 14 and 18, together with exhausting of air through conduit 15, is adjusted whereby the agglomerates being formed in region A progress downwardly without any appreciable carrying of moist aggregates upwardly into contact with the top 11 of section 10a.

The product produced by the above described equipment and method is of a good quality, with a tap bulk density of the order of from 0.250 to 0.555 grams per cubic centimeter. In a typical instance, the screen analysis is as follows:

Plus U.S. 20 mesh—Trace
Plus U.S. 32 mesh—4.0%
Plus U.S. 100 mesh—94.5%
Minus U.S. 100 mesh—5.5%

A typical example of the equipment and process is as follows: The upper end of part 10a had a diameter of about 10 feet, and the opening 12 in the top wall 11 was 5 feet in diameter. The lower end of part 10a and the part 10b had an internal diameter of about 5 feet. The dried feed powder employed was garlic powder having a particle size such that the bulk of the powder passed through a No. 45 U.S. standard screen. Its moisture content was about 6.5%. Air supplied through the conduit 14 was at a temperature of about 150° F. Air supplied to the jacket of the chamber structure was at ambient atmospheric temperature of about 76° F. The amount of moisture imparted to the feed powder in the agglomerating region A was such that the moist agglomerates before drying in region B had a moisture content of about 8%. Such moist agglomerates were quite sticky and were lacking in strength. After progressing through the drying region B, the aggregates delivered to the conveyor 39 had a moisture content of about 7 to 9%. The product temperature within the agglomerating region A was about 85° F., and the temperature within the drying region B was about 100° to 150° F. As previously indicated, the partially dried agglomerates delivered to the conveyor 39 had sufficient strength to be handled by the conveyor and to pass through the drier 42 without serious attrition. The drying air supplied through conduit 46 was about 230° F., and the air supplied to the second and third sections 42b and 42c was at about 228° F. As discharged from the drier 42, the agglomerates were at a temperature of about 146° F.; and after passing through the cooler 51, the temperature had been reduced to about 68° F. The pressure within the chamber was maintained slightly negative, as for example at a negative pressure of about 0.15 inches water column vs an exterior atmospheric pressure of zero inches water column. The product produced by the foregoing example had a bulk density of 0.476 grams per cubic centimeter, with the bulk of the aggregates having a particle size such that they passed through a No. 20 U.S. standard screen but remained upon a No. 100 screen. The aggregates were of such strength that they could be handled and packaged without appreciable attrition. It was found that the processing did not alter the chemical nature of the garlic or its flavor potency.

In the foregoing reference is made to the strength or toughness of the agglomerates. This is a desirable feature of the final product because tough agglomerates resist physical disentegration during handling, blending and filling operations. A test which indicates acceptable toughness to retain the agglomerates' conformation during blending and filling operations is as follows:

The equipment employed is a Ro-tap laboratory sieve shaker, a Tyler No. 40 and a Tyler No. 100 standard sieve, and a standard laboratory analytical balance. Using the shaker with the No. 40 and No. 100 sieves, a sufficient amount of product is supplied to the sieves to provide 100 grams of product between the two sieves. This 100 grams is then supplied again to the No. 100 sieve, with the shaker in operation, for a period of 2 minutes. The collected material passing through the No. 100 sieve is then weighed to provide an index of toughness. This test, when applied to a typical garlic product produced by the present process, demonstrated a toughness such that not more than 2% of collected material passed through the 100 mesh screen. Toughness is attributed to the treatment of the material within the chamber structure 10, including particularly immediate contact of the moist agglomerates formed in region A with hot drying air, as they pass downwardly into region B.

What is claimed is:

1. A method for the production of a dry free flowing agglomerated product from dry powder material selected from the group consisting of garlic and onion or combinations thereof, the method making use of an upright structure forming superposed upper and lower treatment chambers that are in free unobstructed communication, the method comprising the steps of dispersing the dry powder in the air stream and continuously introducing the air stream and dispersed powder into the upper portion of the upper chamber, simultaneously introducing atomized water into the upper chamber and causing the dispersed powder particles to be co-mingled with water droplets, the resulting wetting of the powder particles by contact with water droplets causing the particles to become sticky whereby random contacts of the wetted particles in the upper chamber form dispersed moist porous aggregates that are sticky and have little firmness, continuously introducing hot drying air into the lower portion of the lower chamber, whereby such air progresses upwardly through the lower chamber and upwardly into the upper chamber, the air pressure within both the upper and lower chambers being maintained slightly below atmospheric, and causing the dispersed moist aggregates continuously to progress in free flight downwardly by gravity from the upper chamber into and through the lower chamber whereby sufficient moisture is removed from the dispersed aggregates while progressing through the lower chamber in free flight to render them nonsticky and firm, the aggregates while sticky having minimum contact and adherence with the walls of the chambers, and then subjecting the aggregates to drying to the desired final moisture content.

2. A method as in claim 1 in which the moisture content of the aggregates as formed within the upper chamber ranges from 8 to 14%, and in which the aggregates are dried in the lower drying chamber to a moisture content ranging from 7 to 9%.

3. A method as in claim 2 in which the agglomerated material removed from the lower chamber is further dried to a moisture content ranging from about 4 to 7% and then cooled to a temperature below about 90° F.

4. A method as in claim 1 in which the pressure in both the upper and lower chambers is maintained slightly below atmospheric by continuously removing air from said upper portion of the upper chamber at a controlled rate.

5. A method as in claim 3 in which the temperature in the upper chamber is about 25° F. and the temperature in the lower chamber about 100° to 150° F.

* * * * *